United States Patent [19]

Niemann

[11] Patent Number: 4,486,552
[45] Date of Patent: Dec. 4, 1984

[54] FOG-RESISTANT OLEFIN POLYMER FILMS

[75] Inventor: Debra H. Niemann, Freeport, Tex.

[73] Assignee: The Dow Chemical Company, Midland, Mich.

[21] Appl. No.: 470,116

[22] Filed: Feb. 28, 1983

[51] Int. Cl.$^3$ ................................................ C09K 3/18
[52] U.S. Cl. ................................ 523/169; 524/313; 524/375; 524/376
[58] Field of Search ................ 523/169; 524/313, 376, 524/375

[56] References Cited

U.S. PATENT DOCUMENTS

| | | | |
|---|---|---|---|
| 2,462,331 | 2/1949 | Myers | 524/317 |
| 3,048,263 | 8/1962 | Sacks et al. | 524/312 |
| 3,048,266 | 8/1962 | Hackhel et al. | 524/317 |
| 3,391,129 | 7/1968 | Sparks | 524/375 |
| 4,172,173 | 10/1979 | Trapasso et al. | 524/375 |
| 4,189,420 | 2/1980 | Sugimoto et al. | 524/317 |

FOREIGN PATENT DOCUMENTS

| | | | |
|---|---|---|---|
| 2729886 | 4/1978 | Fed. Rep. of Germany | 524/313 |
| 2833003 | 2/1979 | Fed. Rep. of Germany | 524/313 |
| 1344603 | 10/1963 | France | 524/376 |
| 49-96072 | 9/1974 | Japan | 524/313 |
| 999809 | 7/1965 | United Kingdom | 524/217 |
| 1018262 | 1/1966 | United Kingdom | 524/376 |

*Primary Examiner*—Joseph L. Schofer
*Assistant Examiner*—N. Sarofim
*Attorney, Agent, or Firm*—W. J. Lee

[57] ABSTRACT

An ethylene polymer, especially a linear low density ethylene polymer, is mixed with certain antifog agents to provide a film-forming composition for making packaging films which resist fogging. The antifog agents are (1) an alkoxylated alkyl phenol along with a mixed mono-, di-, and/or triglyceride, (2) a polyoxyalkylene fatty acid ester, and (3) a combination of (2) and any part of (1). Optionally, a tackifier is added.

25 Claims, No Drawings

FOG-RESISTANT OLEFIN POLYMER FILMS

FIELD OF THE INVENTION

This invention relates to novel olefin polymer compositions which are resistant to fogging, especially when employed as a packaging film for moist products.

BACKGROUND OF THE INVENTION

In the field of packaging, whereby polymer films are used for covering or enclosing items of sale, and where film clarity or good optical properties are desired, there is a recognized need for polymer films which resist fogging when exposed to conditions of temperature and humidity which can produce condensation on the film. This condensation is especially troublesome when the interior of the package contains enough moisture to produce fogging of the interior surface of the film. Of special interest here is the packaging of food products, such as meats, bakery items, vegetables, fruits, and the like, though non-food items are also of interest.

Food products are often packaged in polymeric film for ease in handling by customers, to provide sanitary protection of the food product from the environment, to provide an easier and more economical wrapping than paper, or to provide a better view of the food product. Various polymeric materials such as polyvinyl chloride, poly(ethylene/vinyl acetate) and irradiated polyethylenes have been used in the food wrap market with plasticized polyvinyl chloride (PVC) being widely used in the market. Freshly cut meat and vegetables are often packaged in these films, and certain properties are desired of the film for it to perform satisfactorily as a food overwrap. Obviously, film used in this application should have good "see through" clarity so the product can be viewed. High gloss is desired to add "sparkle" to the packages for aesthetic appeal to the customers. As these food products are packaged, they generally experience a temperature change from where they are packaged to where they are stored or sold. This temperature change can cause the formation of water droplets on the inside surface of the film (commonly called "fog"). These water droplets are usually objectionable because they hinder the view of the food products from the consumer and can cause spoilage, particularly to certain vegetables. To prevent water from condensing in droplets, an antifog agent is often added to the film. The antifog agents reduce the surface tension of the water and cause the water to form a continuous sheet, which is then transparent.

Another desired property of the packaging film, to insure a neat package, is good film strength and handleability. Handleability is the ability of the film to stretch and conform to the shape of the food product being wrapped. The film must endure this stretching without puncturing or tearing. This film strength becomes even more important as meat packaging becomes automated. The film also should have enough cling to remain in place over the food product until the package is heat sealed. The film desirably is heat-sealable within the temperature range of the heat-sealers currently in use and provides a strong enough heat seal to retain excess blood and/or water which seeps from the food.

Not only should the package be aesthetically pleasing to the customers but the food product should also have a fresh appearance. This is particularly important for fresh red meat. Slaughtered meat is a deep maroon color and needs oxygen to convert the color of the meat to a bright red color ("bloom") as normally seen in markets. For the most to "bloom", the film used for wrapping must be highly permeable to oxygen. The meat tissue continues to use oxygen in the production of enzymes, so the oxygen permeability must be high enough to maintain the red color of the meat. Fresh red meat should maintain its red color for three to four days, depending on the cut of the meat, the temperature at which the meat has been stored, and the bacterial growth. Another aspect of preserving the appearance of the food product is preventing dehydration. The relative humidity of the refrigerator case is low due to the temperature at which meat is stored. Thus, the film used in wrapping should have a low water vapor permeability to prevent dehydration of the meat.

There is a perceived need in the market place for improved packaging films, especially for food products, most especially for red meat packaging, where the widely used plasticized polyvinylchloride (PVC) requires replacement by a more acceptable film. Much of the PVC which has been used is plasticized with additives, e.g. dioctyl phthalate, which are becoming less acceptable in the market.

U.S. Pat. No. 4,189,420 discloses, inter alia, certain ethylene polymers blended with a polybutene and a mixed glyceride having at least one acyl group of 2 to 6 carbon atoms and at least one acyl group containing 8 to 22 carbon atoms.

U.S. Pat. No. 3,048,266 discloses, inter alia, an antifog agent of polyethylene oxide derivative in a polyolefin composition.

U.S. Pat. No. 3,048,263 discloses, inter alia, a polyolefin anti-fog agent comprising a monoglyceride of a fatty acid.

U.S. Pat. No. 2,462,331 discloses, inter alia, the incorporation into polyethylene of polyhydric alcohol esters or metal salts of either saturated or unsaturated monocarboxylic fatty acids.

SUMMARY OF THE INVENTION

A fog-resistant packaging film is prepared by producing a film of a formulation comprising an ethylene polymer having incorporated therein an antifog agent comprising (1) an alkoxylated alkyl phenol along with a mixed mono-, di- and/or tri-glyceride, or (2) a polyoxyalkylene fatty acid ester, or (3) a combination of (2) and any part of (1).

DETAILED DESCRIPTION OF THE INVENTION

The ethylene polymers of the present invention are those which are characterized as having a melt index, or melt flow value, in the range of about 0.01 to about 20 gms./10 min. as measured by ASTM-D-1238, condition E, and a density in the range of about 0.9 to about 0.96 gms./cc. This includes the branched polymers made at high pressure with a free-radical initiator and those made at low, medium, or high pressure using a coordination catalyst which gives the linear (i.e. substantially non-branched) polymers. Those made using a free-radical initiator (e.g. peroxy compounds) have become known in the art as "low density polyethylene" (LDPE) and those made using a coordination catalyst (e.g. a "Ziegler-type catalyst) have become known as "high density polyethylene" (HDPE).

More recently developed commercially are the so-called "linear low density polyethylenes" (LLDPE)

which are prepared using a coordination catalyst, but which, because of the presence of minor amounts of copolymerized higher olefins (especially olefins of 4–10 carbon atoms) have a density lower than HDPE, yet the arrangement of polymerized molecular units is of the linear type.

It is also contemplated within the purview of the present invention to employ ethylene polymers which contain other comonomers, such as acrylic acid, methacrylic acid, alkyl acrylates, vinyl esters, and carbon monoxide. These type of monomers, which contain oxygen atoms, are employed using a free-radical initiator, but are not very well suitable when coordination catalysts are employed. The coordination catalysts, which generally contain metal-carbon bonds, are usually poisoned or deactivated by compounds containing oxygen-carbon bonds or hydrogen-oxygen bonds when employed in quantities such as are involved in copolymerization thereof. On the other hand, copolymerization of ethylene with the higher hydrocarbon olefins is best done using a coordination type catalyst.

In the present invention, it is preferred that the ethylene polymer be of the LLDPE variety, especially those which have a melt flow value in the range of about 0.1–10 and enough comonomer units to give a density in the range of about 0.9 to about 0.935 gms./cc, such comonomer units being an aliphatic hydrocarbon olefin of from 4 to 8 carbon atoms, including isomers in that range. These LLDPE polymers are recognized in the art as having excellent strength, resistance to tear propagation as shown by Dart Impact and Elmendorf Tear, and exhibit good resistance to tearing or puncturing when stressed against articles having protuberances. This preference for the LLDPE variety is especially important in food packaging applications and most especially in packaging of red meat.

The polymer formulations of the present invention preferably contain an amount of the anti-fog agent in the range of about 0.1% to about 4%, whether it is only one of the agents, or a mixture of the agents, most preferably an amount in the range of about 0.5% to about 3%.

The antifog agent contemplated within the purview of the present invention, for addition to the ethylene polymer, is at least one of the following: (1) an alkoxylated alkyl phenol along with (or in combination with) a mixed mono-, di- and/or triglyceride, or (2) a polyoxyalkylene fatty acid ester, or (3) a combination of (2) and any part of (1) above.

The alkoxylated alkyl phenol is preferably one which is exemplified by the empirical formula

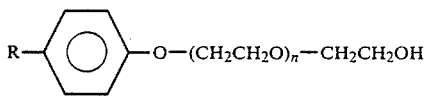

where R is an alkyl group of from 1 to 20 carbon atoms, preferably about 5 to about 15 carbon atoms, most preferably about 6 to about 12 carbon atoms; and where n is preferably a numerical value in the range of about 10 to about 55, more preferably in the range of about 10 to about 30, most preferably in the range of about 12 to about 20. It will be understood that the numerical value n may represent an average value as the length of the polyalkoxy chain can vary somewhat from molecule to molecule. A polyethoxy chain is the preferred polyalkoxy chain.

The mixed glyceride may be exemplified by the empirical formula

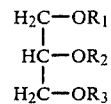

where $OR_1$, $OR_2$, and $OR_3$ represent, independently hydroxyl or a fatty acid ester group, but where at least one of them is a fatty acid ester. Thus, the mixed glyceride is a mono-, di-, or tri-glyceride of a fatty acid. The fatty acid may be saturated or unsaturated and is preferably a mixture of fatty acids having carbon chain lengths in the range of about 12 to about 18 carbons. Palm oil, e.g., is a convenient source of a mixture of fatty acids having carbon chain lengths within the range of about 12–18 carbons.

The preferred polyoxyalkylene fatty acid esters may be exemplified by the empirical formula

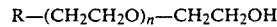

where R is a fatty acid ester group, which may be saturated or unsaturated, and is preferably derived from a mixture of fatty acids having carbon chain lengths in the range of about 12 to 18 carbons; and where n is preferably a numerical value in the range of about 10 to about 55, more preferably in the range of about 10 to about 30, most preferably about 12 to about 20. A polyoxyethylene chain is the preferred polyoxyalkylene chain.

The mixing of the anti-fog agents into the ethylene polymer is done by mixing it into molten polymer by commonly used techniques such as roll-milling, mixing in a Banbury type mixer, or mixing in an extruder barrel and the like. The heat history (time at which held at elevated temperature) can be shortened by mixing the anti-fog agent with unheated polymer particles so as to achieve substantially even distribution of the agent in the mass of polymer, thereby reducing the amount of time needed for intensive mixing at molten temperature.

Conveniently, the anti-fog agent can also be added substantially simultaneously or sequentially with any other additives (colorants, tackifiers, slip agents, block agents, and the like) which may be desired in certain instances. The anti-fog agents may also be preblended with other additives and the blend then added to the polymer. It is contemplated that in some instances these anti-fog agents should have the additional benefit of aiding the other additives to become more easily or evenly dispersed or dissolved in the ethylene polymer. For easier batch-to-batch control of quality, it may be preferred to employ concentrated masterbatches of polymer/agent blends which are subsequently blended, as portions, to additional quantities of polymer to achieve the final desired formulation. The masterbatch, or the neat additives, may be injected into freshly prepared polymer while the polymer is still molten and after it leaves the polymerization vessel or train, and blended therewith before the molten polymer is chilled to a solid or taken to further processing. It is within the purview of the present invention to employ blends or alloys of olefin polymers, whether they be of the above described LDPE, LLDPE, HDPE or other olefin polymers or copolymers made using a free-radical initiator or a coordination catalyst. Polypropylene is an example of an olefin polymer made using a coordination catalyst (e.g. the well-known Ziegler or Natta catalysts or variations thereof) yet which inherently exhibits a low density compared to polyethylene.

It is well known in the art that polybutene or polyisobutylene is an effective tackifier or cling agent when mixed in polyethylene. In packaging processes, good cling properties are desirable in instances wherein the film is expected to cling to itself until pulled apart or until heat-sealed, as the case may be. The polybutenes or polyisobutylenes usually employed for this purpose are generally used in small quantities of only a few percentage points of the total and are usually of low or relatively low molecular weight, having weight average mol wts. in the range of from several hundred to a few thousand. The use of such tackifiers is preferred in certain of the formulations contemplated as being within the purview of the present invention, especially in meat packaging (and the like) where it is desired that substantially no liquid leaks occur during the packaging operation until heat-sealed, or during shipping, storage, and handling after being heat-sealed.

The making of films of ethylene polymers is well-known and includes the techniques of casting films as thin sheets through narrow slit dies, and the blown-film technique wherein an extruded tube of molten polymer is inflated to the desired "bubble" diameter and/or film thickness before being cooled and collected or further processed. These present formulations are also suitable in coextrusion fabrication of films wherein two or more films comprise a multi-layer structure. The anti-fog agents of the present invention can exude through an adjacent film layer which does not contain the anti-fog agent, thereby rendering the adjacent layer resistant to fogging.

In one preferred aspect, the invention comprises a composition of an ethylene polymer resin and additives to form a film suitable for a red meat overwrap. Ethylene polymer resins have the needed strength, optical, and gas permeability properties required for this market. However, they lack the wettability required to prevent moisture droplet formation in the package at lower temperatures. To solve the wettability problem, antifogging agents (such as mono- and diglycerides) commonly used in plasticized PVC film were tried in polyolefin resins. These additives were not as effective in ethylene polymer resins as they were in plasticized PVC film. The lack of plasticizers in ethylene polymer films might contribute to the difference observed in antifogging agents' behavior. Antifogging agents must be able to exude to the surface of the film where they can be effective, but not be abraded from the surface of the film. Antifogging agents that can be easily removed by water or by abrasion from the surface of the film are not desirable because the antifogging agents could flavor the meat, and the film would not be fog resistant. Thus, the invention comprises the unique composition of an ethylene polymer resin and an effective antifogging agent that is not easily abraded from the surface of the film. The use for this mixture of ethylene polymer resin and antifogging agent can be in food overwrap (meat, vegetables, etc.), greenhouse film, or other applications where a clear film with wettability or non-fogging is needed.

This invention differs from the widely used PVC red meat overwrap and produce wrap in that the base resin is an ethylene polymer instead of polyvinyl chloride resin. Ethylene polymer resin has the advantage of not requiring plasticizers (e.g. dioctyl phthalate) such as required and used in PVC films. Antifog agents perform differently in the two different classes of resin. Due to the plasticizers in PVC film, antifog agents are not as easily washed off the surface of the film. Thus, not all antifog agents that work in plasticized PVC film will work in ethylene polymer resin films.

Also, the present invention incorporates the antifogging agent within the resin instead of applying it as a coating. The incorporation of the additive into the resin is less expensive, less labor intensive, and more consistent than coatings applied to the surface of the film. Thus, the present invention utilizes antifogging agents that maintain their antifogging ability on the surface of the film even when the film has experienced abrasion. This aspect is important during the wrapping of food products so as to prevent the food products from absorbing the antifogging agent and to maintain the wettability of the film in the package.

Furthermore, the present invention allows the antifog agents to be incorporated into the resin, and the resin made into film by standard techniques with no additional treatment needed. No irradiation or heat aging is necessary to cause the antifog agent to exude to the surface of the film where it is then effective. The antifog agents exude to the surface of the film within approximately 48 hours after fabrication.

The following examples are to illustrate some particular embodiments, but the present invention is not limited to the particular ones illustrated.

EXAMPLE 1

An ethylene/octene copolymer (LLDPE) with a melt flow value of 2.2 and 0.918 g/cc density was melt blended on the roll mill with 1% by weight of an antifogging agent. The composition of the antifogging agent was: a mixture of an ethoxylated alkyl phenol (having 14 units of ethylene oxide) and a mixed glyceride with $C_{12}$–$C_{18}$ fatty acid adduct. Film was formulated at 0.6 mil (about 0.015 mm) on a cast film unit at 260° C. melt temperature and chill roll of 18° C. The antifogging properties of the film were tested by the following three methods (results are shown in Table I) For comparison purposes, the same LLDPE was tested, but without the additives. The LLDPE is shown in Table I as a "control" run. A commercially available plasticized PVC film is shown for comparison.

Antifogging Test Method #1

A sheet of film was placed over a cup of hot water, and the film and cup were placed in the refrigerator. The film was observed after 30 minutes and the behavior of the film noted. If small droplets were formed, the test result was "fogged". If the film remained clear, the test result was "antifogged".

Antifogging Test Method #2

This method tests the ability of the film surface to retain its antifogging agent even with abrasion. A dampened paper towel was placed in the bottom of the cup, and film was stretched over the top of the cup. The water used to dampen the paper towel was at ambient temperature. The cup was inverted and shaken so that the paper towel washed and abraded the surface of the film. The cup was righted and placed in the refrigerator. After 30 minutes, the film was observed and the behavior recorded. If the film was clear ("sheeting" had occurred), the test result was recorded as "antifogging". If small droplets were formed, the test result was recorded as "fogging".

Antifogging Test Method #3

This test method measured the effectiveness of the antifogging agent to reduce the contact angle of a drop of water on the surface of the film. An instrument (contact angle viewer) has been designed by Kayeness, Inc., to measure contact angles. Previously, this instrument has been used to determine the amount of corona treatment and its effect on the printability of the film by ink. To measure contact angles, a piece of film is carefully placed over a smooth bar without disturbing the surface of the film. Care must be taken to insure that the film is smooth and wrinkle-free. A light shines across the surface of the film and magnifies the image on a screen which is equipped with a protactor and measure guide. A drop of water is placed on the film via a hypodermic syringe. The image of the drop is focused, and the bar is leveled. The size of the droplet is measured—both the height and base of the droplet. The ratio given in Table I is the ratio of the height to the base: height of droplet/base of droplet. The ratio decreases with increasing wettability. The protector is used to determine the contact angle between the water droplet and the surface of the film. The temperature of the film at the time of the test should also be taken. Higher temperatures will cause water evaporation and give erroneous results. Varying the size of the droplet will produce varying contact angles. With repetitions on the same piece of film, this instrument measures a contact angle with ±10% accuracy.

EXAMPLE 2

(Comparison run)

An ethylene/octene copolymer (LLDPE) with a melt flow value of 2.2 and 0.918 g/cc density was melt blended on the roll mill with 1% by weight of a nonylphenoxy poly(ethylene oxy) ethanol having 9 moles ethylene oxide. Film was fabricated in the same manner as Example 1, with the same temperatures. This sample showed no antifogging properties by antifogging Test Method #2 and the contact angle was much greater than in Example 1. This surfactant is similar to those used in plasticized polyvinyl chloride mixtures and is taught in U.S. Pat. No. 4,072,790.

EXAMPLE 3

(Comparison run)

An ethylene/octene copolymer (LLDPE) with a melt flow value of 2.2 and 0.918 g/cc density was melt blended on the roll mill with 1% by weight of a mixed glyceride. Film was fabricated in the same manner as Example 1, with the same temperatures. This sample showed no antifogging properties by antifogging Test Method #2 and had a greater contact angle than in Example 1. This surfactant is used in plasticized polyvinyl chloride film formulations and is taught in U.S. Pat. No. 4,072,790.

EXAMPLE 4

(Comparison run)

An ethylene/octene copolymer (LLDPE) with a melt flow value of 2.2 and 0.918 g/cc density was melt blended on the roll mill with 1% by weight of a glycerol monooleate. Film was fabricated in the same manner as Example 1, with the same temperatures. This sample showed no antifogging properties by Test Method #2 and had a greater contact angle than Example 1. This surfactant is used in plasticized polyvinyl chloride film as taught in U.S. Pat. No. 4,072,790.

EXAMPLE 5 (Comparison run)

An ethylene/octene copolymer (LLDPE) with a melt flow value of 2.2 and 0.918 g/cc density was melt blended on the roll mill with 3% by weight of a mixed mono and diglyceride. Film was fabricated in the same manner as Example 1, with the same temperatures. This sample showed no antifogging properties by Test Method #2 and had a greater contact angle than Example 1. This surfactant is used in plasticized polyvinyl chloride film as taught in U.S. Pat. No. 4,072,790.

EXAMPLE 6

An ethylene/octene copolymer (LLDPE) with a melt flow value of 2.2 and 0.918 g/cc density was melt blended on the roll mill with 1% by weight of polyoxyethylene laurate (about 10 units of ethylene oxide). Film was fabricated in the same manner and at the same temperatures as Example 1. This sufactant exhibited good antifogging properties a measured by the three tests; the data are summarized in Table I.

EXAMPLE 7

(Comparison run)

An ethylene/octene copolymer (LLDPE) with a melt flow value of 2.2 and 0.918 g/cc density was melt blended on the roll mill with 1% by weight of an ethoxylated glycerol monostearate having 60–65 moles ethylene oxide. Film was fabricated in the same manner and at the same temperatures as Example 1. No fogging resistance was observed for this sample in Antifogging Test Method #2, and the contact angle was much greater than in Examples 1 and 6 (see Table I).

EXAMPLE 8

A high pressure homopolymer of ethylene (LDPE) with a melt index of 1.9 and 0.925 g/cc density was melt blended on the roll mill with the same anti-fogging agent as in Example 1. Film was fabricated in the same manner and with the same temperatures as Example 1. This sample exhibited good antifogging properties as measured by the three antifogging tests. The data are summarized in Table I.

EXAMPLE 9

An ethylene/butene copolymer (LLDPE) with a melt flow value of 2.0 and 0.918 g/cc density was melt blended on the roll mill with 1% by weight of the same antifogging agent as Examples 1 and 8. Film was fabricated in the same manner and with the same temperatures as Example 1. This sample exhibited good antifogging properties as measured by the three antifogging tests. The data are summarized in Table I.

EXAMPLE 10

An ethylene/octene copolymer (LLDPE) with a melt flow value of 2.0 and 0.918 g/cc density was melt blended on the Banbury mixer with 1% by weight of the same antifogging agent as Example 1 and 3% by weight of a polyisobutylene ($\overline{M}_n \sim 1300$). Film was fabricated in the same manner and with the same temperatures as Example 1. This sample exhibited good antifogging properties as measured by the three antifogging tests. The data are summarized in Table I.

TABLE I

| Sample | Test #1 | Test #2 | Test #3*** Ratio/Contact Angle (°) | Test #3*** Ratio/Contact Angle (°) | Test #3*** Ratio/Contact Angle (°) | Temp. °C. |
| --- | --- | --- | --- | --- | --- | --- |
| LLDPE (control) | F* | F | 0.41/74° | 0.37/64° | 0.28/62° | 19 |
| Plasticized PVC Film | A** | A | 0.04/9° | 0.08/13° | 0.07/12° | 22 |
| Exam. 1 | A** | A | 0.02/5° | 0.02/6° | 0.02/4° | 20 |
| Exam. 2 | A | F | 0.05/21° | 0.04/20° | 0.06/21° | 20 |
| Exam. 3 | A | F | 0.36/69° | 0.45/74° | 0.37/65° | 22 |
| Exam. 4 | A | F | 0.46/70° | 0.41/69° | 0.39/68° | 23 |
| Exam. 5 | A | F | 0.25/50° | 0.23/48° | 0.23/50° | 20 |
| Exam. 6 | A | A | 0.02/4° | 0.02/4° | 0.02/5° | 22 |
| Exam. 7 | A | F | 0.30/54° | 0.23/41° | 0.20/47° | 21 |
| Exam. 8 | A | A | 0.03/5° | 0.03/5° | 0.03/6° | 21 |
| Exam. 9 | A | A | 0.02/6° | 0.02/4° | 0.02/6° | 17 |
| Exam. 10 | A | A | 0.01/4° | 0.01/4° | 0.01/5° | 22 |

*F = Fogged
**A = Antifogged
***Ratio = $\frac{\text{Height of Droplet}}{\text{Base of Droplet}}$

EXAMPLE 11

A cast film as prepared in Example 1 above is compared with a commercially available plasticized polyvinylchloride (PVC) blown film. Properties are tested in accordance with accepted procedures, using ASTM methods where applicable. The data are in Table II.

TABLE II

| Property | Ex. 1 film | PVC Film |
| --- | --- | --- |
| Thickness (mils converted to mm.) | ~0.015 mm | ~0.014 mm |
| Dart impact, gm. | 82 | 264 |
| Transparency | 64.3 | 55 |
| 45° Gloss | 95.9 | 89 |
| Haze, % | 1.0 | 2.0 |
| Elmendorf Tear, | | |
| machine direction | 54.4 | 32 |
| cross direction | 547.2 | 70 |
| Heat seal range, °C. | 121–127 | 149–177 |
| Tensile, | | |
| machine direction | 10,960 | 6,200 |
| cross direction | 3,320 | 5,270 |
| Yield, | | |
| machine direction | 1,790 | 1,710 |
| cross direction | 650 | 955 |
| Elongation, | | |
| machine direction | 390 | 270 |
| cross direction | 1,010 | 330 |
| $O_2$ permeability | 1,130 | 1,370 |

The data illustrate that formulations of the present invention possess the desired non-fogging properties, while possessing at least adequate physical properties and, as compared to commercially available PVC packaging film, is superior in several respects. Among the superior qualities, one can identify improved transparency, gloss, haze, lower heat seal range, and overall toughness, as compared to the PVC film.

I claim:

1. A fog-resistant packaging film prepared by producing a film of a formulation comprising
   an ethylene polymer having incorporated therein as an antifog agent a minor amount of
   (1) an alkoxylated alkyl phenol along with a mixed mono-, di-, and/or tri-glyceride, or
   (2) a polyoxyalkylene fatty acid ester, or
   (3) a combination of (2) and any part of (1) above, wherein said ethylene polymer is selected from the group comprising linear low density ethylene copolymer, blends of linear low density ethylene copolymer with low density branched polyethylene, and blends of linear low density ethylene copolymer with high density linear polyethylene.

2. The film of claim 1 wherein the minor amount of antifog agent is an amount in the range of about 0.1% to about 4% of the total formulation.

3. The film of claim 1 wherein the ethylene polymer is characterized as having a melt index, or melt flow value, in the range of about 0.01 to about 20 gms/10 minutes and a density in the range of about 0.9 to about 0.96 gms/cc.

4. The film of claim 1 wherein the antifog agent comprises a mono-, di-, and/or tri-glyceride of saturated or unsaturated mixed fatty acids of about 12 to about 18 carbon atoms, along with
   an alkyl phenol etherified with polyethylene oxide having 10 to 55 ethylene oxide units.

5. The film of claim 1 wherein the antifog agent comprises a fatty acid of about 12 to about 18 carbon atoms esterified with polyethylene oxide having 10 to 55 ethylene oxide units.

6. The film of claim 1, wherein the antifog agent comprises
   a mono-, di-, and/or tri-glyceride of mixed fatty acids of about 12 to about 18 carbon atoms, and
   an alkyl phenol etherified with polyethylene oxide having 10 to 55 ethylene oxide units, and
   a fatty acid ester of polyethylene oxide having 10 to 55 ethylene oxide units.

7. The film of claim 1 wherein the antifog agent comprises
   a fatty acid of about 12 to about 18 carbon atoms esterified with polyethylene oxide having 10 to 55 ethylene oxide units, and
   a mono-, di-, and/or tri-glyceride of mixed fatty acids of about 12 to about 18 carbon atoms.

8. The film of claim 1 wherein the antifog agent comprises
   a fatty acid of about 12 to about 18 carbon atoms esterified with polyethylene oxide having 10 to 55 ethylene oxide units, and
   an alkyl phenol etherified with polyethylene oxide having 10 to 55 ethylene oxide units.

9. The film of claim 1 wherein the ethylene polymer is a linear low density ethylene copolymer having a melt flow value in the range of about 0.01 to about 20 gms/10 minutes and a density in the range of about 0.9 to about 0.935 gms/cc.

10. The film of claim 1 wherein the ethylene polymer comprises a blend of low density branched polyethylene having a melt index in the range of about 0.01 to about 20 gms/10 minutes and a density in the range of about 0.9 to about 0.935 gms/cc with linear low density ethylene copolymer.

11. The film of claim 1 wherein the ethylene polymer comprises a blend of high density linear polyethylene having a melt index in the range of about 0.01 to about 20 gms/10 minutes and a density in the range of about 0.94 to about 0.96 gms/cc with linear low density ethylene copolymer.

12. The film of claim 1 wherein the ethylene polymer has a melt index, or melt flow value, in the range of about 0.1 to about 10 gms/10 minutes.

13. The film of claim 1 wherein the antifog agent comprises about 0.5% to about 3% of the total weight.

14. The film of claim 1, having blended therein a minor amount of a tackifier agent.

15. The film of claim 1, having blended therein a minor amount of a tackifier agent selected from the group comprising atactic polypropylene, polybutene, and polyisobutylene.

16. The film of claim 1, having blended therein a minor amount of polyisobutylene.

17. The film of claim 1, having blended therein, in an amount effective as a tackifier agent, a low molecular weight polymer of the group comprising polybutene, polyisobutylene, and polypropylene, said low molecular weight being a weight average molecular weight in the range of from several hundred to several thousand.

18. A film-forming composition comprising a linear low density ethylene polymer having intimately admixed therewith a minor amount of a tackifier agent and a minor amount of an antifog agent,
said ethylene polymer comprising a copolymerization product of ethylene with a minor amount of at least one mono-olefin having from 3 to 10 carbon atoms, and having a density in the range of about 0.9 to about 0.935 gms/cc and a melt flow value in the range of about 0.01 to about 20 gms/10 minutes,
said tackifier agent being selected from the group consisting of low molecular weight atactic polypropylene, polybutene, and polyisobutylene, and
said antifog agent being a fatty acid ester of polyethylene oxide, said polyethylene oxide moiety containing from about 10 to about 55 ethylene oxide units.

19. A film-forming compositon comprising a linear low density ethylene polymer having intimately admixed therewith a minor amount of a tackifier agent and a minor amount of an antifog agent,
said ethylene polymer comprising a copolymerization product of ethylene with a minor amount of at least one mono-olefin having from 3 to 10 carbon atoms, and having a density in the range of about 0.9 to about 0.935 gms/cc and a melt flow value in the range of about 0.01 to about 20 gms/10 minutes,
said tackifier agent being selected from the group consisting of low molecular weight atactic polypropylene, polybutene, and polyisobutylene, and
said antifog agent being an ethoxylated alkyl phenol along with a mixed mono-, di-, and/or tri-glyceride.

20. A film-forming composition comprising a linear low density ethylene polymer having intimately admixed therewith a minor amount of a tackifier agent and a minor amount of an antifog agent,
said ethylene polymer comprising a copolymerization product of ethylene with a minor amount of at least one mono-olefin having from 3 to 10 carbon atoms, and having a density in the range of about 0.9 to about 0.935 gms/cc and a melt flow value in the range of about 0.01 to about 20 gms/10 minutes,
said tackifier agent being selected from the group consisting of low molecular weight atactic polypropylene, polybutene, and polyisobutylene, and
said antifog agent being a fatty acid ester of polyethylene oxide, said polyethylene oxide moiety containing from about 10 to about 55 ethylene oxide units, along with at least one additional antifog agent selected from the group consisting of
an ethoxylated alkyl phenol and a mixed mon-, di-, and/or tri-glyceride.

21. A masterbatch formulation for blending with additional ethylene polymer, said master batch comprising the formulation of claim 1.

22. A masterbatch formulation for blending with additional ethylene polymer, said masterbatch comprising the formulation of claim 1 wherein the olefin polymer of the masterbatch is low density polyethylene, LDPE, and the said additional ethylene polymer is linear low density ethylene copolymer, LLDPE.

23. The film of claim 1 wherein the ethylene polymer in the formulation comprises a blend of LDPE and LLDPE.

24. The film of claim 1 in combination with a product which is packaged in the film.

25. A greenhouse film comprising the film of claim 1.

* * * * *

UNITED STATES PATENT AND TRADEMARK OFFICE
CERTIFICATE OF CORRECTION

PATENT NO. : 4,486,552
DATED : December 4, 1984
INVENTOR(S) : Debra Hoppe Niemann It is certified that error appears in the above—identified patent and that said Letters Patent is hereby corrected as shown below:

Column 2, line 2 "most" should read --meat--.
Column 5, line 25 "techniques" should read --technique--.
Column 7, line 18 "protactor" should read --protractor--.
Column 7, line 25 "protector" should read --protractor--.
Column 8, line 23 "sufactant" should read --surfactant--.
Column 8, line 24 "a" should read --as--.
Column 9, line 60 "incorported" should read --incorporated--.
Column 10, line 22 "," should omit.
Column 11, line 33 "compositon" should read --composition--.
Column 12, line 25 "mon-" should read --mono--.

Signed and Sealed this

Eleventh Day of June 1985

[SEAL]

Attest:

DONALD J. QUIGG

Attesting Officer   Acting Commissioner of Patents and Trademarks